US 11,249,713 B2

(12) United States Patent
Soni et al.

(10) Patent No.: US 11,249,713 B2
(45) Date of Patent: Feb. 15, 2022

(54) ONLINE CONFERENCE COLLABORATION BY LEVERAGING A PLURALITY OF CLIENT DEVICES

(71) Applicant: Adobe Inc., San Jose, CA (US)

(72) Inventors: Sachin Soni, New Delhi (IN); Ajay Jain, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 547 days.

(21) Appl. No.: 15/418,504

(22) Filed: Jan. 27, 2017

(65) Prior Publication Data
US 2018/0217801 A1  Aug. 2, 2018

(51) Int. Cl.
G06F 3/14 (2006.01)
H04L 29/06 (2006.01)
G09G 5/14 (2006.01)
G06Q 10/10 (2012.01)

(52) U.S. Cl.
CPC .......... *G06F 3/1454* (2013.01); *G06F 3/1462* (2013.01); *G06Q 10/101* (2013.01); *G09G 5/14* (2013.01); *H04L 65/1073* (2013.01); *H04L 65/1093* (2013.01); *H04L 65/4038* (2013.01); *G09G 2350/00* (2013.01); *G09G 2354/00* (2013.01); *G09G 2370/02* (2013.01)

(58) Field of Classification Search
None
See application file for complete search history.

(56) References Cited

U.S. PATENT DOCUMENTS

| 2009/0019367 A1* | 1/2009 | Cavagnari | G06F 21/62 715/716 |
| 2013/0086458 A1* | 4/2013 | Kurata | G06T 11/60 715/202 |
| 2013/0191757 A1* | 7/2013 | Smith | G06F 3/0488 715/748 |
| 2014/0006949 A1* | 1/2014 | Briand | G06F 3/04817 715/716 |
| 2015/0032809 A1* | 1/2015 | Xie | H04L 65/403 709/204 |
| 2018/0267768 A1* | 9/2018 | Shin | G06F 3/048 |

* cited by examiner

*Primary Examiner* — Matthew Ell
*Assistant Examiner* — David V Luu
(74) *Attorney, Agent, or Firm* — FIG. 1 Patents

(57) ABSTRACT

Online conference collaboration techniques and systems are described in which a plurality of client devices may be leveraged by a single user to participate as part of an online conference. In one example, a user input is received that is initiated as part of the online conference by a first client device. The user input identifies a portion of a plurality of portions of a user interface that support user participation as part of the online conference by the first client device and a second client device that is to output the identified portion. In response, the second client device is caused to join the online conference and caused to display the identified portion of the user interface.

20 Claims, 7 Drawing Sheets

ONLINE CONFERENCE COLLABORATION BY LEVERAGING A PLURALITY OF CLIENT DEVICES

BACKGROUND

Online conferences including web conferencing, online meetings, webinars, and so forth are implemented to provide an immersive and interactive experience to users via corresponding client devices via a network. As part of this, user interfaces that support user interaction as part of the online conference typically include several different portions to support different types of user interaction. The portions, for instance, may include a portion to view a web cam, another portion to share documents, a further portion to indicate which users (i.e., attendees) are participating in the online conference, and so forth. Thus, each of the portions may be used to increase a level of immersion and interaction as part of the online conference.

However, viewing of these different portions within the user interface may complicate a user's view of the user interface and actually serve to decrease a level of immersion and interaction supported by these portions. In one such example, addition of different portions may act to clutter a user's view of the user interface and reduce an ability of a user to interact with each of the portions. This problem is further exacerbated as users continue to employ small screen devices, such as mobile phones and tablets, to interact with the online conference.

SUMMARY

Techniques and systems are described to enable participation of a single user as part of an online conference to expand across several different client devices, such as mobile phones, tables, televisions, and so forth. For example, the user may interact with a user interface of the online conference via a user interface that includes a plurality of portions, such as a video portion, a sharing portion, a chat portion, and so forth. The user interface is configured to receive user inputs that specify a particular portion of the user interface (e.g., a sharing portion) and a client device that is to be used to output that particular portion, e.g., a television. The user inputs, once received by a conference system that manages the online conference, then causes the identified client device to output that particular portion, which may be preregistered with the conference system. In this way, several client devices may expand a user's ability to interact as part of the online conference using a greater number of portions of the user interface that otherwise would not be possible using conventional techniques that limit participation, at any one time, to a single device.

In one example, a user input is received that is initiated within the online conference by a first client device. The user input identifies a portion of several different portions of a user interface used to interact as part of the online conference by the first client device and a second client device that is to output the identified portion. The first and second client devices, for instance, may be pre-registered as part of a conference system that hosts the online conference. In response, the second client device is joined to the online conference and caused to display the identified portion of the user interface. In this way, user interaction as part of the online conference may expand across several different client devices.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
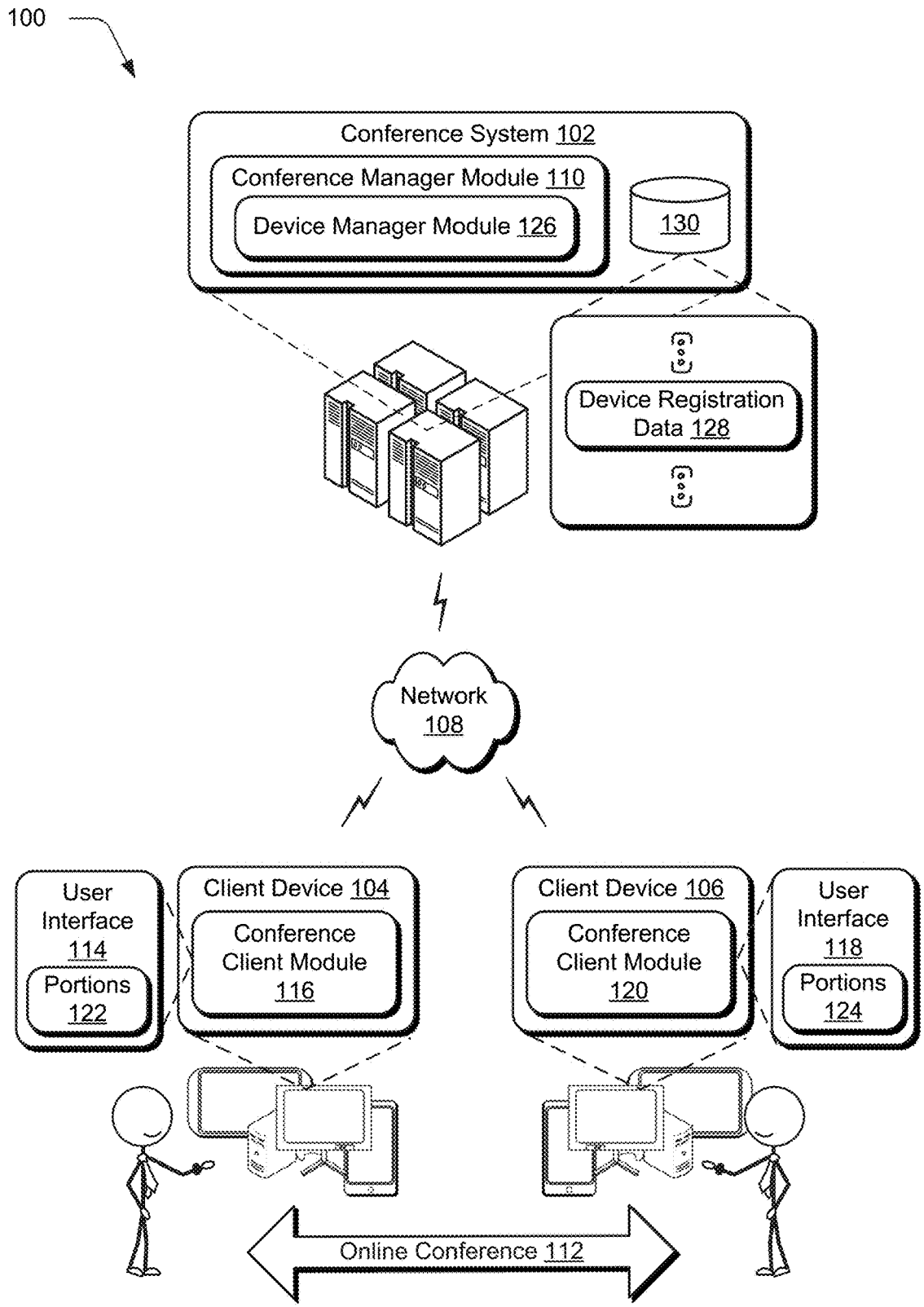
FIG. 1 is an illustration of an environment in an example implementation that is operable to employ online conference collaboration techniques described herein.

Techniques and systems are described to enable participation of a single user as part of an online conference to expand across several different client devices, such as mobile phones, tables, televisions, and so forth. For example, the user may interact with a user interface of the online conference via a user interface that includes a plurality of portions, such as a video portion, a sharing portion, a chat portion, and so forth. The user interface is configured to receive user inputs that specify a particular portion of the user interface (e.g., a sharing portion) and a client device that is to be used to output that particular portion, e.g., a television. The user inputs, once received by a conference system that manages the online conference, then causes the identified client device to output that particular portion, which may be preregistered with the conference system.

Online conferences, for instance, are typically implemented to provide an immersive and interactive experience to users via corresponding client devices over a network. As part of this, user interfaces that support user participation as part of the online conference often include several different portions to support different types of user interaction. However, a view of these different portions within the user interface may result in clutter and thus complicate a user's view of the user interface. As a result, inclusion of these different portions may actually decrease a level of immersion and participation as part of interaction with the user interface and thus run counter to the purpose of including these portions.

Online conference collaboration techniques and systems are described in which a several different client devices may be leveraged by a single user to participate as part of an online conference. In this way, a user may participate as part of an online conference by leveraging a plurality of different client devices and even types of client devices that may be readily available in a physical environment of the user.

A user, for instance, may join an online conference using a mobile phone and view a webcam of another participant of the online conference within a corresponding portion of a user interface output by the mobile phone. During the online conference, the other participant may wish to share a document for viewing by the user within the user interface. The mobile phone, however, may have a limited display area and thus may support a limited ability to display the document within a sharing portion of the user interface simultaneously with a webcam portion of the user interface.

Accordingly, the user may select an option in the user interface that identifies a particular portion of the user interface (e.g., the sharing portion) and identifies another device that is to be used to output that portion, e.g., a smart television. Data describing this selection is communicated by the mobile phone to a conference system in this example, which locates device registration data that corresponds to the smart television. The device registration data, for instance, may be stored as part of pre-registration of devices as part of a user's account. This data is then employed by the conference system to cause (e.g., pair) the smart television to join the online conference as being associated with the user as well as to cause the smart television to display the sharing portion. In one example, this also causes display of the sharing portion to cease on the mobile phone. As a result, a user's participation as part of an online conference may expand across additional devices as desired to support increased immersion and interaction. Further, this may be used to increase efficiency in computational resource consumption for each device by reducing back and forth navigation within a user interface between different portions as required in conventional techniques and thus additional rendering and network bandwidth involved in rendering of the user interface to support this navigation. Additional examples of which are described in the following sections and shown in corresponding figures.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ online conference collaboration techniques described herein. The illustrated environment 100 includes a conference system 102 and client devices 104, 106, that are communicatively coupled, one to another, via a network 108. Computing devices that implement the conference system 102 and client devices 104, 106 may be configured in a variety of ways.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, a single computing device may be representative of several different devices, such as multiple servers utilized by a business to perform operations "over the cloud" as described in FIG. 7.

The conference system 102 includes a conference manager module 110. The conference manager module 110 is implemented at least partially in hardware of a computing device (e.g., processing system and computer-readable storage media) to manage an online conference 112 between the client devices 104, 106. The online conference 112, for example, may be configured as a web conference, online meeting, webinar, and so forth.

A user interacting with client device 104, for instance, may provide a user input through interaction with a user interface 114 of a conference client module 116 (e.g., mobile application, third-party browser plug-in, etc.) to initiate the online conference 112. This may include specifying a time at which the online conference 112 is to begin and end, attendees that are permitted to join the online conference 112 (e.g., a user of client device 106), a title and subject matter of the online conference, and so forth.

The conference manager module 110, upon receipt of data corresponding to the user input, is configured to initiate the online conference 112 as instructed. A user of client device 106, for instance, may interact with a user interface 118 output by a conference client module 120 to join the online conference 112. This may include selection of a secure (e.g., obscured) link, provision of user credentials, download of the conference client module 120 for execution within a browser, and so forth. The conference system 102 may then manage the online conference 112, such as to serve as an intermediary for communications between the client devices 104, 106. In another example, functionality of the conference system 102 is implemented in whole or in part through use of the conference client modules 116, 120, such as to support a peer-to-peer network, direct communication between the client devices 104, 106 via the network 108, and so forth.

The online conference 112, as previously described, is typically configured to provide an immersive and interactive experience. To do so, user interfaces 114, 118 output by respective conference client modules 116, 120 include several different portions 122, 124, respectively. Each of these portions 122, 124 is typically configured to support different types of user interaction as part of the online conference. Examples of these portions 122, 124 of respective user interfaces 114, 118 include a presentation portion (e.g., material to be shared with each attendee of the online conference 112), a note portion (e.g., notes to be shared by a presenter), a share portion (e.g., documents, spread sheets, or other digital content shared with other attendees), a chat portion (e.g., to communicate with all or one particular attendee within the online conference 112), a poll portion (e.g., to poll attendees of the conference), a notepad portion (e.g., to retain notes personal to particular attendees of the online conference 112), or an attendee portion to list "who" is attending the online conference 112.

Inclusion of each of these portions 122 in the user interface 114, however, may further complicate user interaction and thus run counter to a goal in providing an immersive and interactive experience as part of the online conference 112. Accordingly, techniques and systems are described herein in which additional client devices that may be readily available to a single user may be used to expand the single user's ability to interact as part of the online conference 112.

A user of client device 104 configured as a desktop computer, for instance, may have ready access to a mobile phone. Conventionally, however, interaction as part of the online conference 112 by a single user is limited to use of a single client device. As such, the user is forced to choose in this conventional example between use of the mobile phone (e.g., having increased mobility but limited display area) and the desktop computer (e.g., having limited mobility but increased display area). In the techniques described herein, a user interacting with the user interface 114 of client device 104 is provided an option to expand interaction to one or more additional client devices, simultaneously, and thus is not limited to a choice of a single device.

The conference manager module 110, for instance, is illustrated as including a device manager module 126. The device manager module 126 is implemented at least partially in hardware of a computing device to support use of multiple client devices by a single user as part of interaction with an online conference 112. The user of client device 104, for instance, may interact with a user interface 114 to pre-register client devices as associated with a user account of the user with the conference system 102. Device registration data 128 is then maintained in storage 130 (e.g., a database or other type of storage device or computer-readable storage medium as described further in relation to FIG. 7) by the conference system 102 that is associated with this registration. The device registration data 128, for instance, may include data usable by the device manger module 126 to join respective client devices to the online conference 112. This may include use of device-identifying information such as network addresses, phone numbers, software and hardware capabilities supported by respective devices for interaction as part of the online conference 112, and so forth.

During the online conference 112, the user may then interact with the user interface 114 to specify which portions 122 of the user interface 114 are to be displayed on respective client devices associated with the user. In this way, a user is provided an ability to interact with multiple client devices as part of a single online conference 112 with portions 122 displayed on the client devices as specified by the user, which is not possible in conventional techniques.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
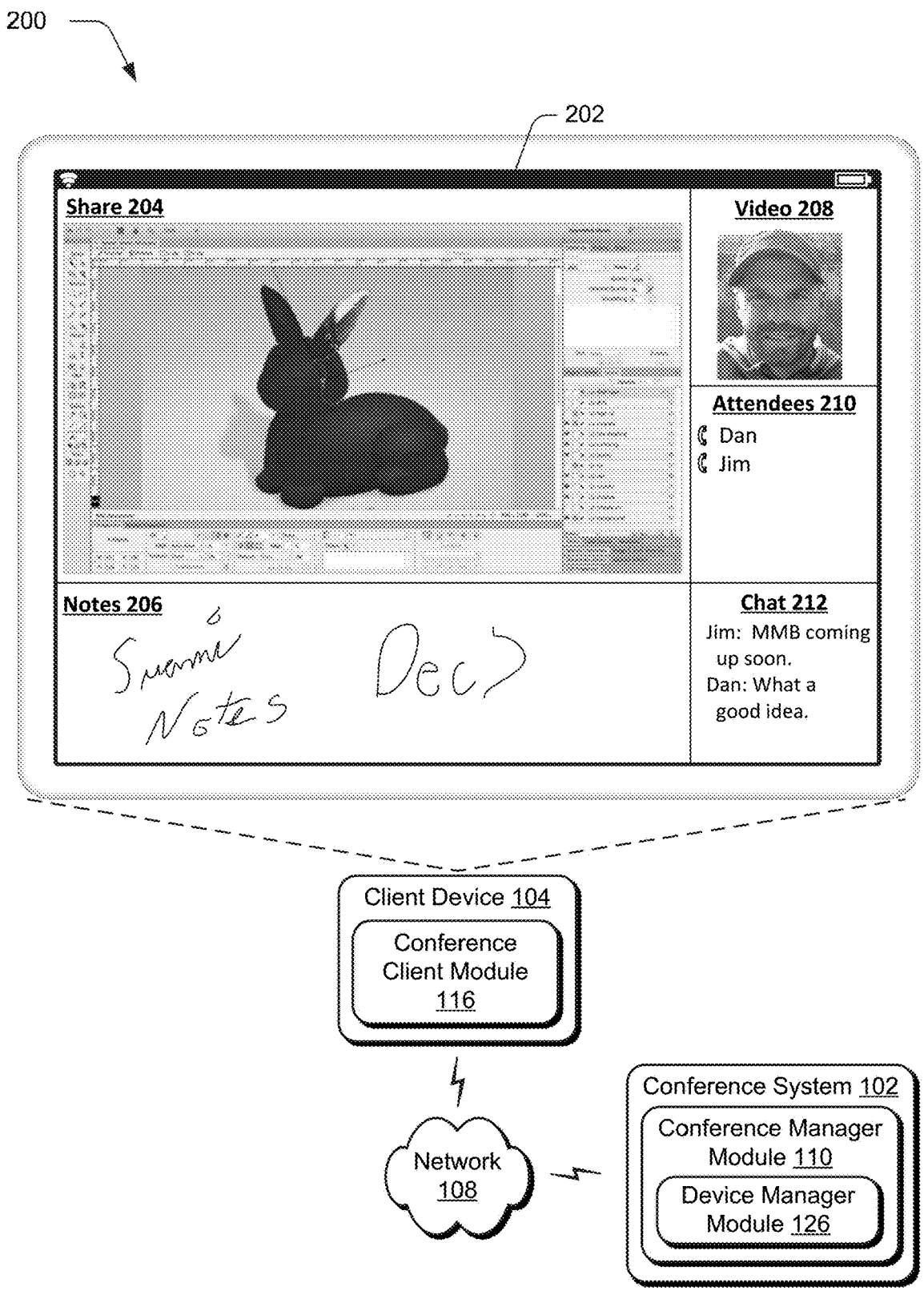
FIG. 2 depicts a system in an example implementation showing a client device of FIG. 1 as outputting a user interface having several different portions.

FIG. 2 depicts a system 200 in an example implementation showing the client device 104 of FIG. 1 as outputting a user interface having several different portions 122. As previously described, portions of a user interface used to interact as part of an online conference 112 may take a variety of forms. In the user interface 202 of FIG. 2, for instance, the portions 122 of FIG. 1 include a sharing 204 portion, notes 206 portion, video 208 portion, attendees 210 portion, and chat 212 portion. Each of these portions 204-212 provide part of the user interface 202 that allows users to interact with respective devices through graphical icons and visual indicators.

These portions are also separately modifiable in the user interface 202 in this example, such as to resize a portion, arrange in layers, expand or dismiss, and so forth. The portions may be made accessible via the user interface as part of single view, a scrollable view, may be rearranged with respect to each other, accessed through use of tabs having different respective portions (e.g., for use in mobile device scenarios), and so forth. The user interface 202 also includes an ability to interact with the device manager module 126 to specify particular portions of the user interface 202 for display on a user-specified client device, an example of which is described in the following and shown in a corresponding figure.

Figure 3:
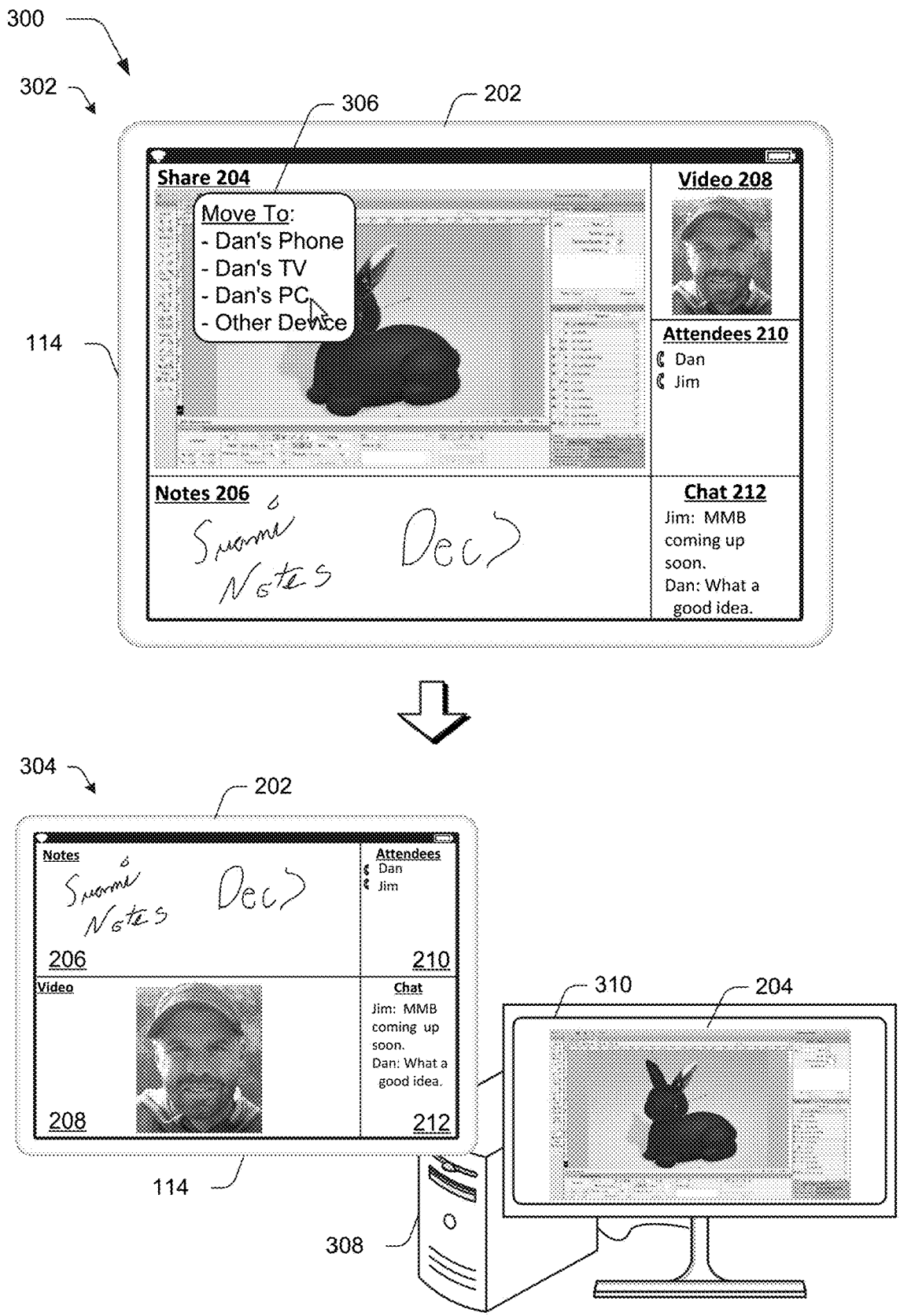
FIG. 3 depicts a system in an example implementation showing user interaction a client device of FIG. 1 to cause a portion of a user interface to be displayed on another client device associated with the user.

FIG. 3 depicts a system 300 in an example implementation showing user interaction the client device 104 of FIG. 1 to cause a portion of the user interface 202 to be displayed on another client device associated with the user. This system 300 is shown using first and second stages 302, 304. At the first stage 302, the client device 114 outputs and displays the user interface 202 on a display device as described above. The user interface 202 includes the sharing 204 portion, notes 206 portion, video 208 portion, attendees 210 portion, and chat 212 portion.

During attendance of an online conference 112, a user interacting with the client device 114 may decide to cause a portion of the user interface 202 to be displayed on another client device. The sharing 204 portion of the user interface 202, for instance, may include detailed information that is difficult to view on the client device 114 when assuming a mobile configuration, e.g., a mobile phone or tablet.

Accordingly, a user input is received by the client device 114 that is initiated through interaction with a particular portion of the user interface 202. A user, for instance, may "right click" on the share portion 204. This causes output of a menu 306 in this example that is populated with representations of other client devices that are associated with a user account of the user. The device manager module 126, for instance, may populate the menu based on device registration data 128 that was pre-registered as associated with a user account of the user as part of the conference system 102. The menu 306 also includes an option to specify another client device that is not pre-registered, e.g., through an "other device" option.

In this example, a user input is received that selects a representation of "Dan's PC" in the menu 306 for a corresponding share 204 portion of the user interface 202. In response, the share 204 portion is transferred for display by the represented client device 308 in a user interface 310. This also causes display of the share 204 portion to cease by the client device 114. In the illustrated example, remaining portions 206, 208, 210, 212 of the user interface 202 are resized and rearranged automatically and without user interaction. This improves a user's view of the user interface 202 with a simultaneous view of the share 204 portion on the user interface 310 of the other client device 308, i.e., Dan's PC. In this way, a user may quickly and intuitively expand and change interaction with the online conference 112 by leveraging different capabilities of additional client devices as further described in the following and shown in corresponding figures.

Figure 4:
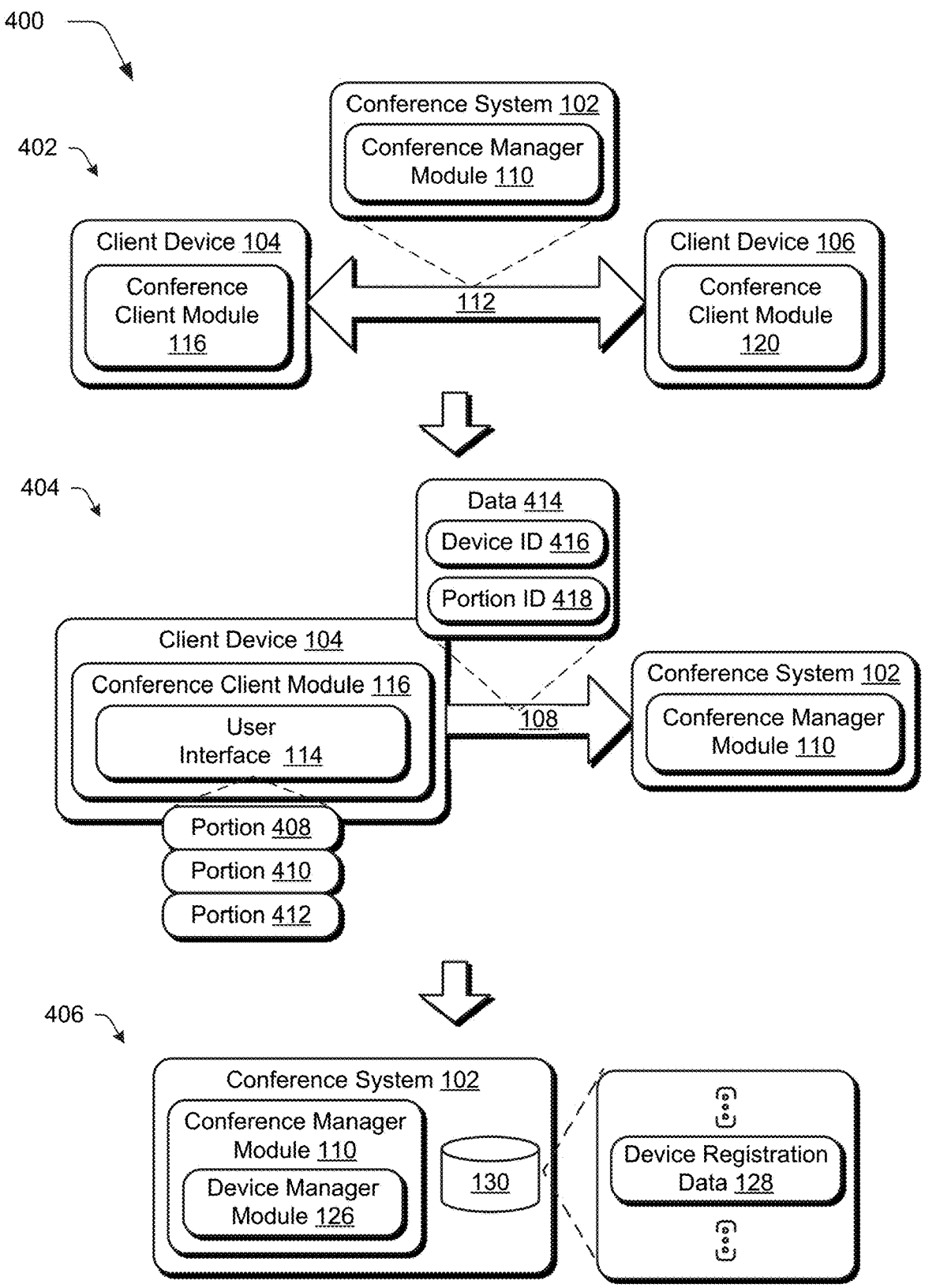
FIG. 4 depicts a system in an example implementation in which a first client device initiates an operation to join a client device to an online conference and display an identified portion of a user interface.
Figure 5:
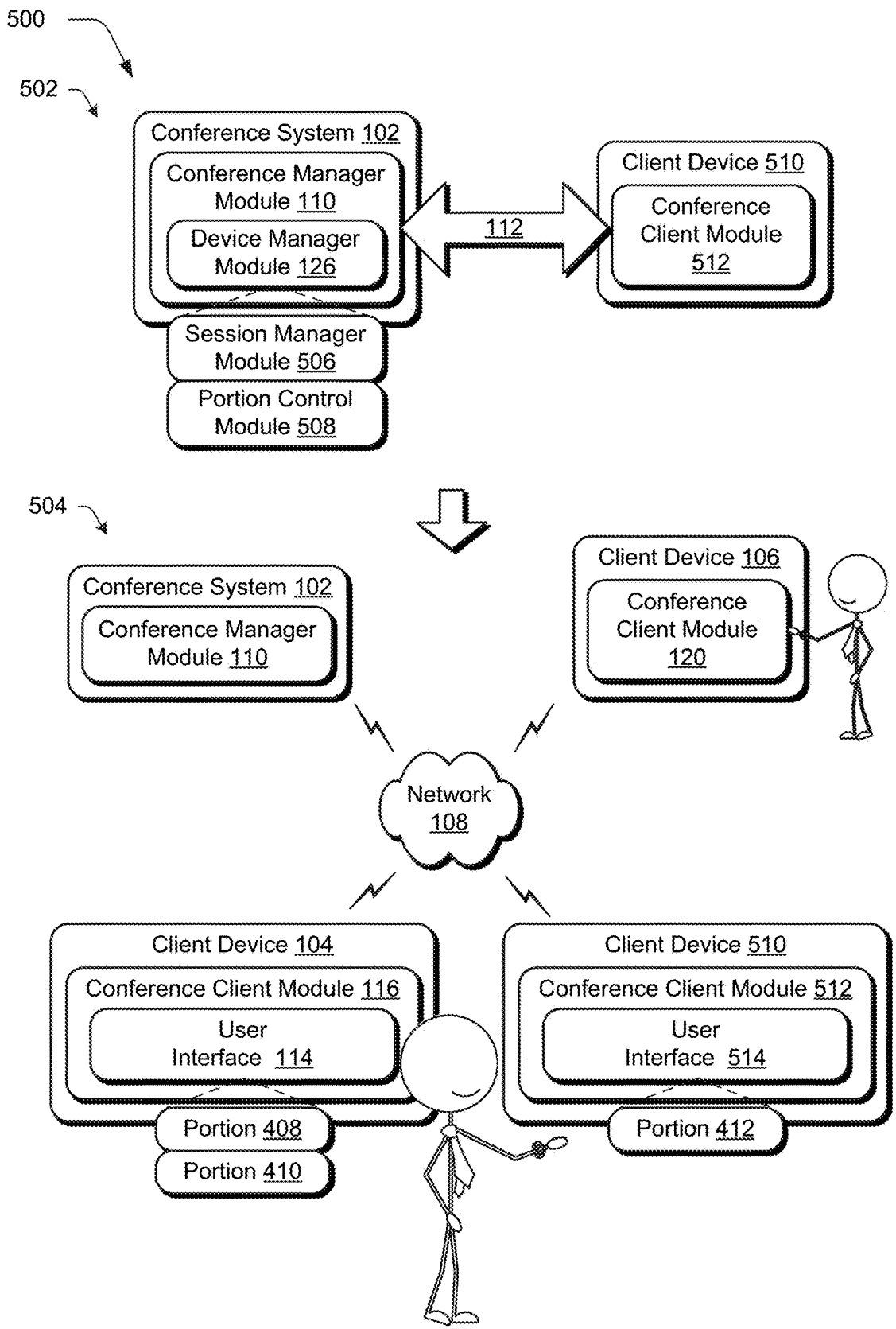
FIG. 5 depicts a system in an example implementation in which the second client device of FIG. 4 is added to the online conference and displays the identified portion of the user interface.
Figure 6:
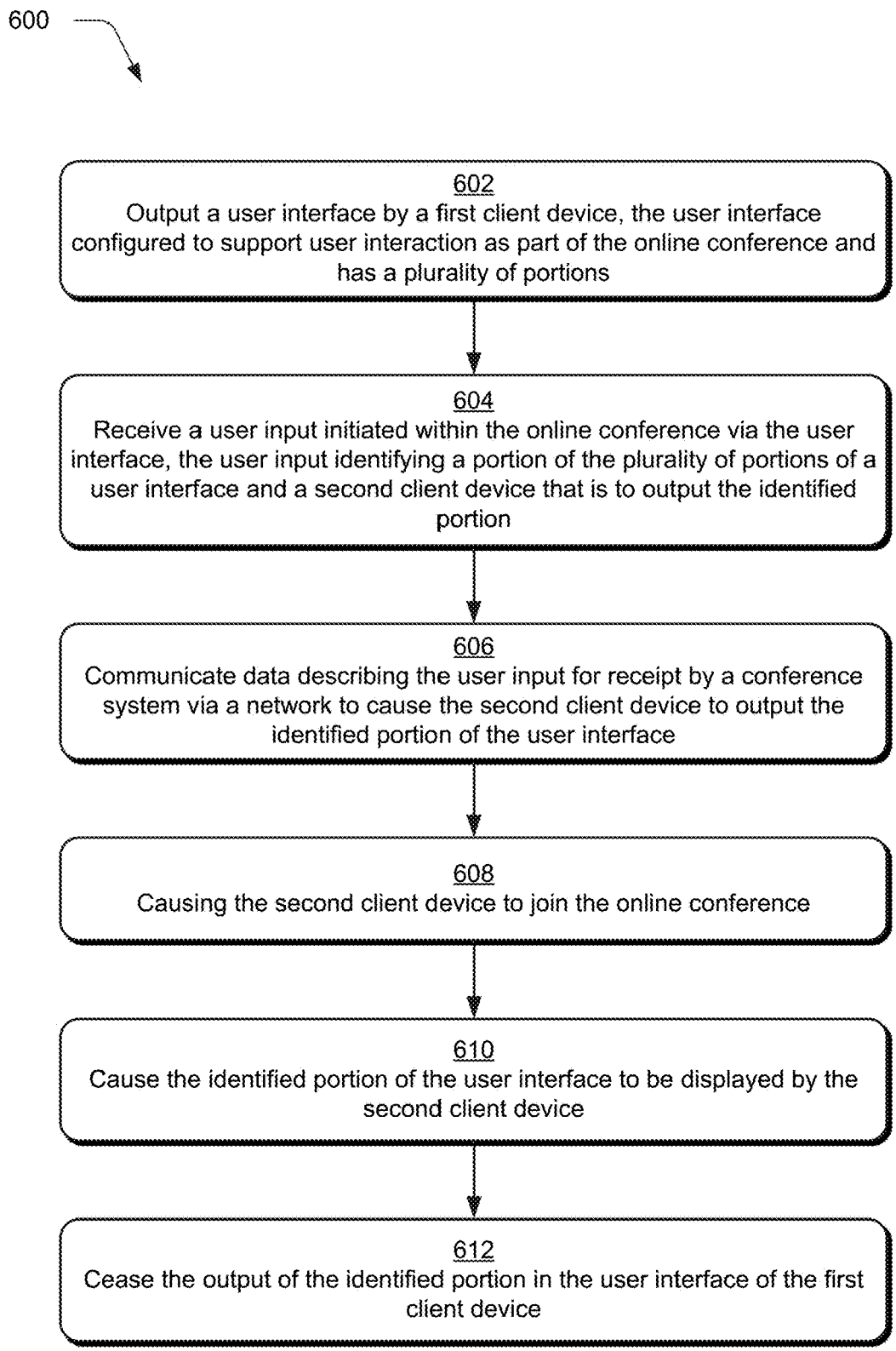
FIG. 6 is a flow diagram depicting a procedure in an example implementation in which a user input specifying a portion of a user interface and a client device that is to be used to display that portion is used to expand user interaction as part of an online conference.

FIG. 4 depicts a system 400 in an example implementation in which a first client device initiates an operation to cause a client device to join an online conference and display an identified portion of a user interface. FIG. 5 depicts a system 500 in an example implementation in which the second client device is added to the online conference and is caused to display the identified portion of the user interface. FIG. 4 is illustrated using first, second, and third stages 402, 404, 406 and FIG. 5 is illustrated using first and second stages 502, 504. FIG. 6 depicts a procedure 600 in an example implementation in which a user input specifying a portion of a user interface and a client device that is to be used to display that portion is used to expand user interaction as part of an online conference 112.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 4-6.

To begin at the first stage 402 of FIG. 4, an online conference 112 is managed by a conference system 102 between a client device 104 as associated with a first user and a client device 106 associated with a second user. The online conference may take a variety of forms, such as a web conference, online meeting, webinar, and so forth. In the illustrated example, communication as part of the online conference 112 employs the conference system 102 as an intermediary between the two client devices 104, 106. Other examples are also contemplated, such as to incorporate functionality of the conference manager module 110 as part of the conference client modules 116, 120 to support a direct peer-to-peer network between the devices without an intermediary system, e.g., the conference system 102.

At the second stage 404, a user interface 114 is output by the client device 104 of the first user. The user interface 114 is configured to support user interaction as part of an online conference 112 and has several different portions 408, 410, 412 (block 602). As previously described, each of the plurality of portions 408-412 may be configured to support corresponding functionality, such as notes, a webcam, attendees, and so on as previously described.

A user input is then received that is initiated within the online conference 112 by the first client device 104. The user input identifies a portion of several different portions 408-412 of a user interface used to interact as part of the online conference 112 by the client device 104 and another client device that is to output the identified portion (block 604). The conference client module 116, for instance, may output the user interface 114 as previously described, e.g., as user interface 202 of FIG. 2. User interaction with the user interface 114 (e.g., via drop down menu, a "right click," gesture, spoken utterance, and so forth) may be used to identify a particular one of the portions 408-412 to be moved and another client device that is to serve as a destination for output of the portion, e.g., "Dan's PC" in the example of FIG. 3.

In response, data 414 is communicated that describes the user input for receipt by a conference system 102 via a network 108 to cause the other client device to output the identified portion of the user interface (block 606). The data 414, for instance, may include a device ID 416 specifying an identity of the other client device (e.g., through pre-registered data or input data through "other device" option) and a portion ID 418 specifying a particular one of the plurality of portions that is to be "moved" to the other client device. The portion ID 418, for instance, may be assigned through preregistration, generic through use of an email that is then output by the other client device to join the online conference 112, and so forth.

At the third stage 406, the device manager module 126 of the conference system 102 locates device registration data 128 corresponding to the other client device based on the data 414 received from the client device 104. The device manager module 126, for instance, may locate device registration data 128 based on the device ID 416 of the indicated other client device that is to output the indicated portion 412 of the user interface 114. This data may then be used by the device manager module 126 to join the other client device to the online conference 112 and display the indicated portion as further described in the following.

At the first stage 502 of FIG. 5, for instance, the device manager module 126 employs a session manager module 506 and a portion control module 508. The session manager module 506 is implemented at least partially in hardware of a computing device to manage inclusion of attendees (i.e., "permission") as part of the online conference. This includes verification of credentials and pairing of resources such that the other client device 510, through a corresponding conference client module 512, may join and participate in the online conference 112.

The session manager module 506, for instance, may send a request to the client device 510 that is selectable to download the conference client module 512 to join the online conference 112. Upon download and provision of credentials, the second client device is caused to join the online conference (block 608) by the session manager module 506.

Once joined, a portion control module 508 is implemented at least partially in hardware of a computing device to cause the other client device 510 associated with the first user to display the identified portion of the user interface (block 610). The portion control module 508, in one example, is also configured to cause the output of the identified portion to cease by the first client device (block 612). A result of this is shown at the second stage 504, in which the client device 104 includes a user interface 114 that displays portions 408, 410. Client device 510 also includes a user interface 514, which is used to display portion 412. Thus, portion 412 has been moved from client device 104 to client device 510 and a single user may interact with both client devices 104, 510 simultaneously to participate as part of the online conference 112, e.g., with a user of client device 106. As part of participation in the online conference 112, the single user may be identified as participating as part of the online conference 112, even when using both client device 104, 510 to do so. This may be used to reduce confusion of other attendees of the online conference, e.g., by indicating a separate user for each client device. An attendee 210 portion of FIG. 2, for instance, may indicate that "Dan" is participating as part of the online conference even though Dan may be employ multiple client devices 104, 308 to do so. In another example, the user "Dan" is indicated along with which client devices are in use by Dan to participate as part of the online conference 112.

In this example, a user specified manually which device is to output which portion of the user interface 114. Other examples are also contemplated. The device manager module 126, for instance, may automatically select which portion of the user interface 114 is to be displayed on which device based on a configuration of a previous session by a user, capabilities of respective devices when joined to the online conference 112 (e.g., always display video on a TV), and so forth.

Example System and Device

Figure 7:
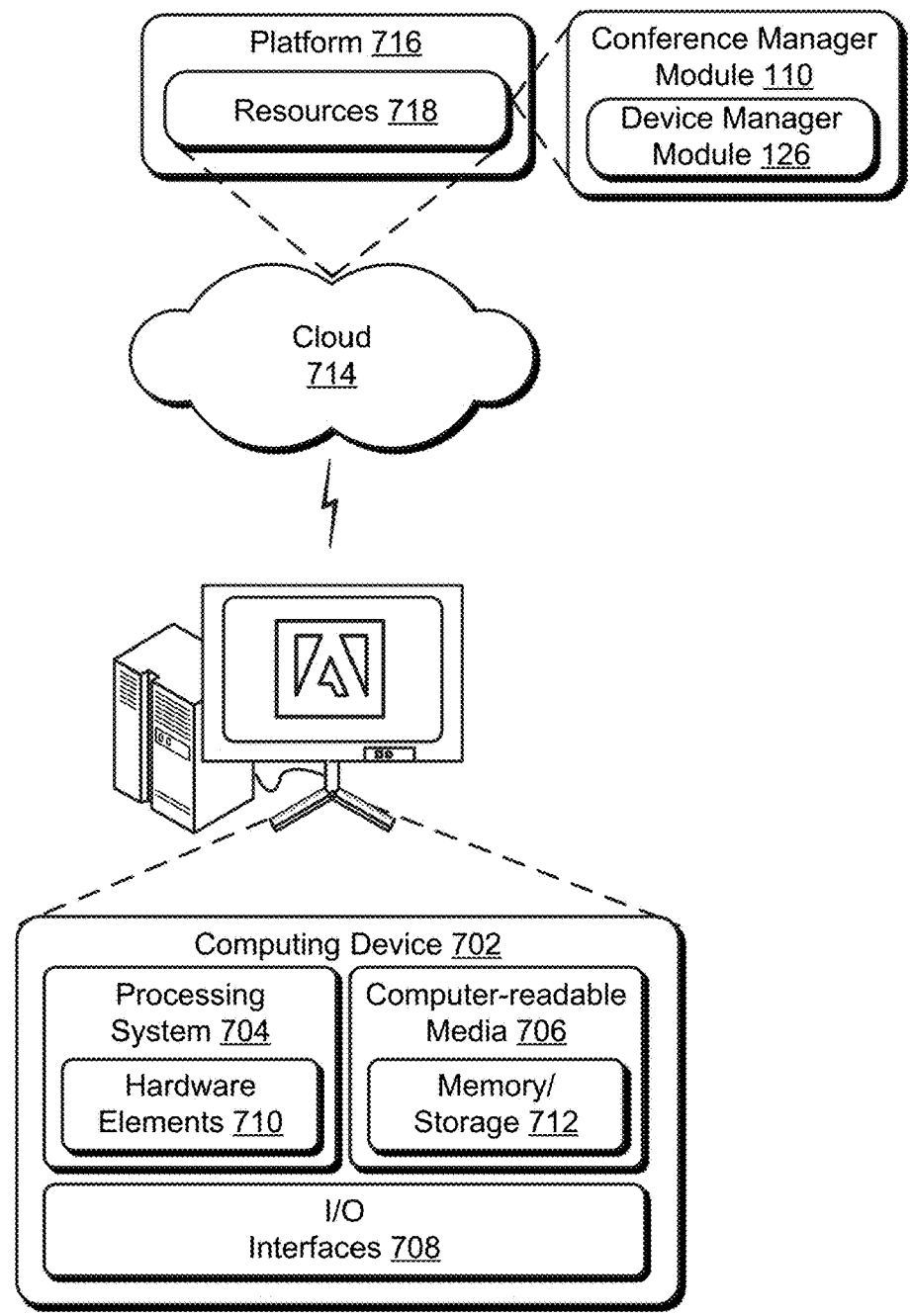
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the conference manager module 110 and device manager module 126. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In an online conference within a digital medium environment, a method implemented by a first client device of a conference system, the method comprising:

receiving, by the first client device, a user input from a first user initiated through interaction with a particular portion of a plurality of portions of a user interface of the online conference, the plurality of portions of the user interface include a sharing portion, a note portion, a notepad portion, an attendee portion, and a poll portion;

displaying, by the first client device, a menu responsive to the user input, the menu including representations of a plurality of client devices to join the online conference and an option to specify another client device that is not pre-registered, wherein the menu is populated based on device registration data that was pre-registered as associated with a user-account of a user of each of the plurality of client devices;

selecting, automatically by the first client device, a portion of the plurality of portions of the user interface to be displayed by a second client device of the plurality of client devices, the selecting based on software and hardware capabilities supported by the first and second client devices and a configuration of a previous session by the first user;

communicating data, by the first client device, the data causing the portion of the user interface to be displayed by the second client device; and resizing and rearranging, by the first client device, automatically and without user interaction from the first user, the plurality of portions of the user interface.

2. The method as described in claim 1, further comprising ceasing a display of the portion by the first client device.

3. The method as described in claim 1, further comprising identifying the first user as a single user as attending the online conference using both the first client device and the second client device.

4. The method as described in claim 1, wherein the first and second client devices both interact directly with the conference system via a network.

5. The method as described in claim 1, wherein the second client device is caused to join the online conference based at least in part on the device registration data.

6. The method as described in claim 1, wherein the plurality of portions of the user interface also include a presentation portion.

7. The method as described in claim 1, wherein the plurality of portions of the user interface also include a chat portion.

8. In an online conference within a digital medium environment, a first client device comprising:

a processing system; and a computer-readable storage medium having instructions stored thereon that, responsive to execution by the processing system, causes the processing system to perform operations comprising:

outputting a user interface configured to support user interaction as part of the online conference, the user interface having a plurality of portions, the plurality of portions of the user interface include a sharing portion, a note portion, a notepad portion, an attendee portion, and a poll portion;

receiving a user input from a first user initiated through interaction with a particular portion of the plurality of portions of the user interface as part of the online conference;

displaying a menu responsive to the user input, the menu including representations of a plurality of client devices to join the online conference and an option to specify another client device that is not pre-registered, wherein the menu is populated based on device registration data that was pre-registered as associated with a user-account of a user of each of the plurality of client devices;

selecting, automatically, a portion of the plurality of portions of the user interface to be displayed by a second client device of the plurality of client devices, the selecting based on software and hardware capabilities of the first and second client devices and a configuration of a previous session by the first user;

communicating data, by the first client device, the data causing the portion of the user interface to be displayed by the second client device; and resizing and rearranging, automatically and without user interaction from the first user, the plurality of portions of the user interface.

9. The first client device as described in claim 8, wherein the operations further comprise ceasing a display of the portion by the first client device.

10. The first client device as described in claim 8, wherein the communicating causes both the first client device and the second client device to be identified as corresponding to the first user as a single user as part of the online conference.

11. The first client device as described in claim 8, wherein the second client device interacts directly with the conference system via a network to receive the portion.

12. The first client device as described in claim 8, wherein the second client device is joined to the online conference based on the device registration data.

13. The first client device as described in claim 8, wherein the plurality of portions of the user interface also include a presentation portion.

14. The first client device as described in claim 8, wherein the plurality of portions of the user interface also include a chat portion.

15. In an online conference within a digital medium environment, a method implemented by at least one computing device of a conference system, the method comprising:

receiving, by the at least one computing device, data from a first client device identifying:
- a plurality of portions of a user interface of an online conference, the plurality of portions of the user interface include a sharing portion, a note portion, a notepad portion, an attendee portion, and a poll portion; and
- a portion of the plurality of portions, the portion to be displayed by a second client device of a plurality of client devices, the portion selected automatically by the first client device based on hardware and software capabilities of the first and second client devices and a configuration of a previous session by a first user of the first client device;

displaying, by the at least one computing device, a menu in the user interface, the menu including representations of the plurality of client devices and an option to specify an additional client device that is not pre-registered, wherein the menu is populated based on device registration data that was pre-registered as associated with a user account of a user of each of the plurality of client devices;

causing, by the at least one computing device, the second client device to join the online conference and display the portion; and responsive to causing the second client device to join the online conference, rearranging and resizing, by the at least one computing device, automatically and without user interaction from the first user, the plurality of portions of the user interface.

16. The method as described in claim 15, further comprising identifying the first user as a single user as attending the online conference using both the first client device and the second client device.

17. The method as described in claim 15, wherein the plurality of portions of the user interface also include a chat portion.

18. The method as described in claim 15, wherein the plurality of portions of the user interface also include a presentation portion.

19. The method as described in claim 15, further comprising ceasing display of the portion by the first client device.

20. The method as described in claim 15, wherein the first client device is a mobile phone or a smart television.

* * * * *